US010993376B2

(12) United States Patent
Crumpler, Jr.

(10) Patent No.: US 10,993,376 B2
(45) Date of Patent: May 4, 2021

(54) PROTECTIVE COVER FOR ROUND COTTON MODULES

(71) Applicant: Eugene Crumpler, Jr., Abernathy, TX (US)

(72) Inventor: Eugene Crumpler, Jr., Abernathy, TX (US)

(*) Notice: Subject to any disclaimer, the term of this patent is extended or adjusted under 35 U.S.C. 154(b) by 4 days.

(21) Appl. No.: 16/355,108

(22) Filed: Mar. 15, 2019

(65) Prior Publication Data

US 2020/0288640 A1 Sep. 17, 2020

(51) Int. Cl.
*A01F 25/13* (2006.01)
*B65B 27/12* (2006.01)
*B65B 63/02* (2006.01)

(52) U.S. Cl.
CPC .............. *A01F 25/13* (2013.01); *B65B 27/12* (2013.01); *B65B 63/02* (2013.01)

(58) Field of Classification Search
CPC ....... B65B 27/125; B65B 63/02; B65B 27/12; A01F 25/13
USPC ............ 206/83.5, 597; 150/154; 52/3; 428/2
See application file for complete search history.

(56) References Cited

U.S. PATENT DOCUMENTS 1,114,755 A * 10/1914 Hansen ................... A01F 25/10 52/5
4,221,085 A * 9/1980 Conaghan ............... A01F 25/13 150/154
4,538,385 A * 9/1985 Kandarian .............. A01F 25/13 150/154
4,712,672 A * 12/1987 Roy ........................ A01F 25/13 206/83.5
4,781,291 A * 11/1988 VanGinhoven ....... A01F 15/071 206/83.5
4,869,363 A * 9/1989 Goldberg ................ A01F 25/13 206/83.5
4,917,008 A * 4/1990 van den Wildenberg .................. A01F 15/0715 100/5
5,104,714 A * 4/1992 Leiber .................... D04B 21/12 428/131
5,215,191 A 6/1993 Wright
5,386,905 A 2/1995 Porter
5,511,655 A 4/1996 Porter
5,691,056 A * 11/1997 Vandyk ................... A01F 25/13 150/154
5,720,382 A 2/1998 Porter
8,186,400 B2 5/2012 Lummis et al.
8,512,851 B2 * 8/2013 Mass .......................... C09J 7/38 428/195.1
2006/0283531 A1 * 12/2006 Eisenbarth .............. A01F 25/13 150/154
2009/0283045 A1 * 11/2009 Rutkowski .............. A01F 25/13 119/51.01

* cited by examiner

*Primary Examiner* — Rafael A Ortiz
(74) *Attorney, Agent, or Firm* — Jacobson Holman PLLC

(57) ABSTRACT

A protective cover for round cotton modules is provided that includes a body covering the plastic-wrapped perimeter of the cylindrical bale and two ends walls, each having a semi-circular to circular perimeter, that cover a majority portion of the exposed ends of the cotton module. The cover is secured in place by at least one cinching structure that extends around the perimeter of the bale at a height that is below the maximum diameter of the bale.

20 Claims, 6 Drawing Sheets

PROTECTIVE COVER FOR ROUND COTTON MODULES

BACKGROUND OF THE INVENTION

Field of the Invention

The present invention is related to the field of agriculture and, more particularly, to a cover for protecting the plastic-wrapped sides and exposed ends of round cotton modules of the type produced by spindle type cotton baler picking machines.

Description of the Related Art

Traditionally, cotton picking machines produced rectangular bales that were often covered after production by a tarpaulin or other like kind of waterproof fabric cover to protect the cotton while being kept in a field awaiting a scheduled time at a cotton ginning facility. Various patents directed to protective covers for rectangular cotton modules include U.S. Pat. No. 4,538,385 to Kandarian, U.S. Pat. No. 4,869,363 to Goldberg, and U.S. Pat. No. 5,386,905 to Porter. Modern cotton picking machines like the John Deere® CS690 and CP690 baler cotton pickers introduced by Deere & Company in or around 2007 both pick cotton and build on-board round cotton modules that are wrapped in plastic by the machine and then dispensed from the rear of the picker as it progresses through the cotton field harvesting the crop. While referred to as "round modules", these cotton bales are actually cylindrical with the plastic wrapping surrounding the circumference of the bale. The plastic wrap includes a lip that extends over the outer edge on each end of the bale that helps keep the cotton compressed and the bale intact. However, the bale ends are otherwise open so that the cotton is exposed, leaving it vulnerable to being degraded by the environment while waiting to be ginned. In addition, if the plastic wrap should be damaged, particularly in the lip region, the integrity of the bale is compromised, allowing the cotton to spill out, resulting in lost crop yield for the cotton farmer.

Accordingly, a need exists for a protective cover for round cotton modules that both reinforces the plastic wrap and also covers the open ends of the cotton bales.

SUMMARY OF THE INVENTION

In view of the foregoing, the present invention is directed to a protective tarpaulin-type cover with a cinching structure for a round cotton module. The tarp is configured to fittingly cover both the top of the bale, the sides and the ends thereof and to be secured around the bale with the cinching structure. The cover is generally referred to herein as a "tarp" with the understanding that this term is intended to cover any kind of waterproof or semi-waterproof fabric or other woven material suitable for the purpose of protecting cotton modules in the manner disclosed herein. Also, as used herein the "top" and "sides" of the cotton bale is the upper and side cylindrical surfaces when the bale is resting on its lower cylindrical surface as is conventional in cotton module placement and/or storage in a field or other holding area. The terms "cotton bale" and "cotton module" are used interchangeably and with the same meaning.

According to one preferred construction, the tarp is used to cover a round cotton module that is formed of a relatively large volume of seed cotton compressed into a cylindrical shape and wrapped with plastic by a baler cotton picking machine. The tarp includes a flat generally rectangular body sheet to which are attached two end walls. The body sheet covers the top and most, or all, of the sides of the bale. Each of the end walls is also a flat sheet but is cut to be substantially semi-circular in perimeter shape, having an arched top edge and preferably a straight bottom edge. The end walls cover the exposed ends of the cotton module which are generally perpendicular to the longitudinal length of the cylindrical bale when the bale is resting on the ground.

The flat body sheet is sewn or otherwise secured along each of its front and rear edges to at least the arched top edge of a respective one of the end walls. As used herein "front edges" and "rear edges" of the body sheet are defined as such only for ease of description since the cylindrical shape of the cotton bale is symmetrical and therefore either end of the body sheet may be considered the "front" or the "rear". In like manner, either end of the bale may be the "front" end or the "rear" end.

The lower side edges of the flat body sheet on either side of the bale extend adjacent to and generally parallel with the ground, as do the bottom edges of the end walls. Both the side edges of the body sheet and the bottom edges of the end walls are provided with a cinching structure. According to a preferred embodiment, the cinching structure includes a plurality of spaced ring members, which are preferably rigid such as metal D-rings, through which a cinching element, which may be a rope, cord, chain, strap or the like, is passed and tightened to secure the cover around the cotton bale near the base thereof. The "base" of the cotton bale is the lower cylindrical side upon which the bale typically rests. Preferably, upper and lower sets of D-rings are provided, each set having a respective cinching element, to ensure that the cover is well secured on the bale. The lower set of D-rings is adjacent the lowermost edge or hem of the sides and end walls while the upper set is spaced about 12 inches above the lower set and is in generally parallel relationship therewith. The distance between the apex of the arched top edge and the generally straight bottom edge of each end wall is greater than half the height of the cotton bale when resting longitudinally, and preferably greater than three-quarters the height of the cotton bale to ensure that the cinching elements are secured around the bale at a point that is below, and preferably well below, the maximum diameter or midpoint of the bale when resting on the ground or other flat surface. Thus, the tarp covers a major portion (more than 50%) of the exposed ends of the cotton module.

Each cinching element is a continuous strand, whether constructed as a single element or as segments fastened end to end, that extends from a first end of the tarp at the front of the bale, along a first side thereof, across the rear of the bale and back along a second side of the bale to a second end that meets up with the first end. Each continuous strand is threaded through one of the sets of D-rings secured near the hem of the tarp. The two ends are pulled simultaneously to cinch the hem of the tarp against, or nearly against, the bale, and then tied or otherwise secured to one another to lock the tarp in place. The two ends may be tied together at any point around the bale.

Because of the shape of the tarp, and the extent of its coverage as extending well below the midpoint or maximum diameter of the circular exposed faces of the bale, the cinching element does not need to bite into or compress the exterior of the cotton module and in fact does not do so. Rather, the cinching element secures the tarp around the bale due to its positioning below the maximum diameter of the bale. As a result, the tarp is effectively secured without having any impact on, encroachment into, or compression of the exterior surface of the cotton module.

According to a second embodiment, the end walls of the tarp are provided with two side flaps on opposing sides of the end wall. The side flaps fold toward the longitudinal center of the cotton module, and generally parallel with the longitudinal sides of the bale, to overlap with adjacent portions of the flat body sheet and are spaced from the flaps at the opposite end of the bale by a center tongue area on each side of the bale. The flap structure allows the tarp to be expanded to accommodate larger bale ends and to cover more of the loose cotton that may be expanding outwardly where the cotton is not constrained by the plastic wrap.

In use, the tarp is placed over the cotton bale with the body sheet overlying the plastic wrapped cylindrical top and sides of the bale and the end walls covering the exposed bale ends. If the tarp has flaps, the flaps are folded back over the sides of the bale, with the cinching element running through the D-rings to extend from the distal ends of the front flaps, across the center tongue on each respective side, and to the distal ends of the rear flaps so as to fully encircle the bale around its longitudinal perimeter in a continuous loop as with the tarp that does not include flaps. The hem of the cover is then cinched snugly at a height below the midpoint of the bale by pulling the opposing ends of each of the cinching elements, as extending through the two sets of D-rings, respectively, toward one another and securing the cinching elements in a snugged down configuration against the perimeter of the cotton bale with the cinching elements holding the flaps in position.

Accordingly, it is an object of the present invention to provide a tarpaulin cover for round cotton modules as generated by baler cotton picking machines such as the John Deere® CS690 and CP690 baler cotton pickers.

Another object of the present invention is to provide a tarp for round cotton modules in accordance with the preceding object in which the tarp protects the plastic sheet material wrapped around the cylindrical perimeter of the cotton module by the cotton picking machine and also covers the exposed ends of such bale, reducing the risk of environmental contamination and the resulting financial losses associated with reduced quantity and quality of the baled cotton.

Yet another object of the present invention is to provide a tarp for round cotton modules in accordance with the preceding objects in which tarp includes a generally rectangular flat body sheet and two end walls attached at the front and rear of the body sheet, the end walls being flat and semi-circular in perimeter with an arched top edge and a substantially straight bottom edge, at least the arched top edge of the end walls being secured to the front and rear edges of the body sheet.

Still another object of the present invention is to provide a tarp for round cotton modules in accordance with the preceding objects in which the side edges of the body sheet near the hem and the bottom edges of the end walls are provided with a cinching structure.

A further object of the present invention is to provide a tarp for round cotton modules in accordance with the preceding object in which the cinching structure includes a plurality of spaced ring members secured to the tarp through which a cinching element such as a rope, cord, chain, strap, cable, and the like, is passed to tighten the hem of the tarp around the cotton bale.

A still further object of the present invention is to provide a tarp for round cotton modules in accordance with the preceding object in which the cinching structure is secured around the cotton module at a height below the midpoint or maximum diameter of the round module.

Yet a further object of the present invention is to provide a tarp for round cotton modules in accordance with the preceding objects in which the distance between the apex of the arched top edge and the generally straight bottom edge of each end wall is greater than half the height of the cotton bale so that the lower edges of the tarp extend below the maximum diameter of the bale at its midpoint.

Another object of the present invention is to provide a tarp for round cotton modules in accordance with the preceding objects in which each end wall has two side flaps on opposing sides of said end wall to expand the tarp so it can cover enlarged bale ends, the flaps on each end folding toward the longitudinal center of the cotton module to overlap adjacent portions of the flat body sheet.

Still another object of the present invention is to provide a method of using a tarp for round cotton modules in accordance with the preceding objects in which the tarp is placed over the cotton bale with the body sheet overlying the plastic-wrapped cylindrical top and sides of the bale and with the end walls covering the bale ends, the hem of the tarp cover being cinched snugly below the vertical midpoint of the bale by pulling the opposing ends of the cord or rope, as extending through the D-rings, toward one another, and tying or otherwise securing the two ends together.

Still another object of the present invention is to provide a tarp for round cotton modules that covers the bale including the plastic-wrapped top and sides thereof as well as the exposed ends and is cinched near ground level with a cinching element to secure the tarp to the bale.

Yet another object of the present invention is to provide a tarp for round cotton modules in accordance with the preceding objects that is simple and inexpensive to manufacture and that is reliable and can be reused repeatedly for years of cost-effective use.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
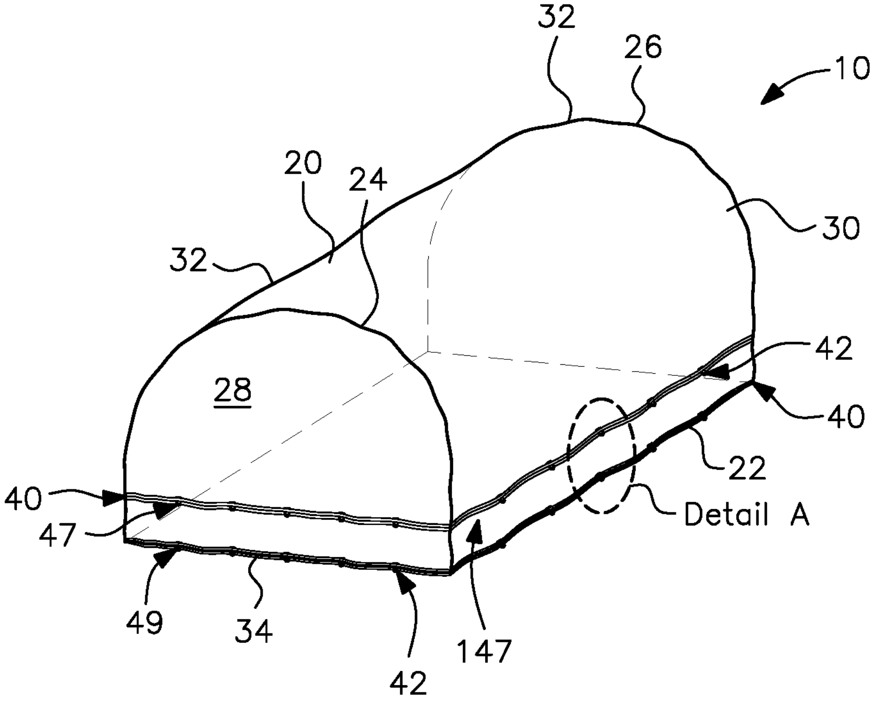
FIG. 1 is a front perspective view of a tarp for covering a round cotton module in accordance with a first embodiment of the present invention.

It is to be understood that the embodiments disclosed herein are by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 3:
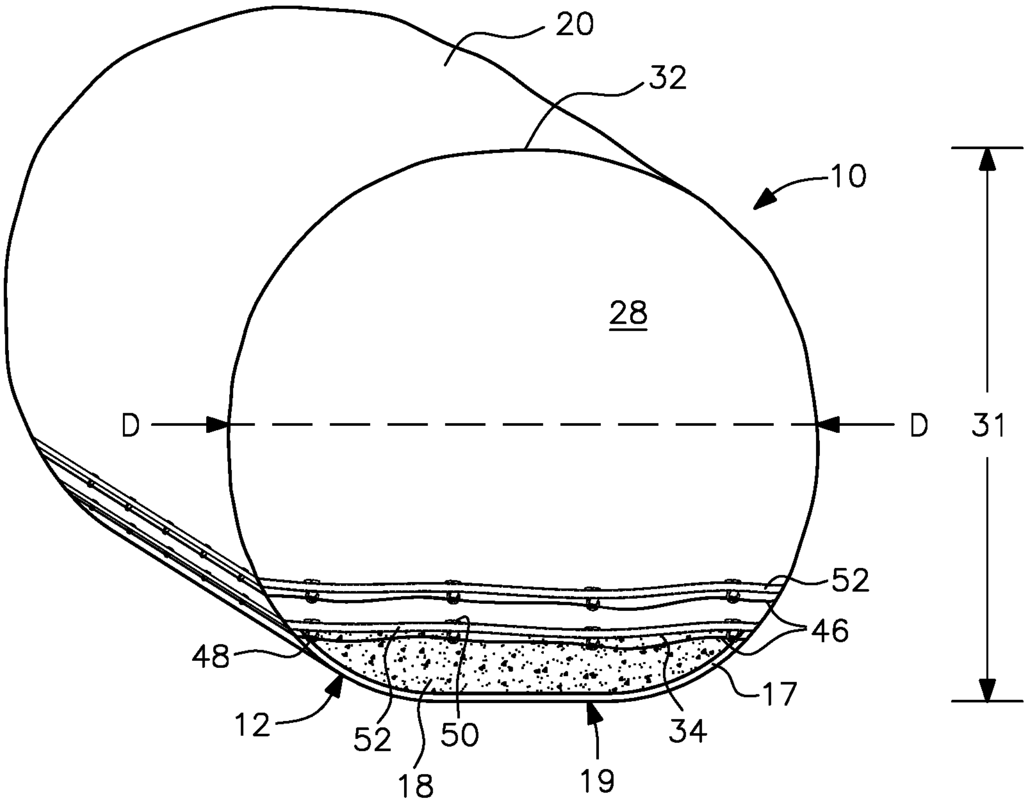
FIG. 3 is a front perspective view of the tarp shown in FIG. 1 as secured to cover a round cotton module.
Figure 4:
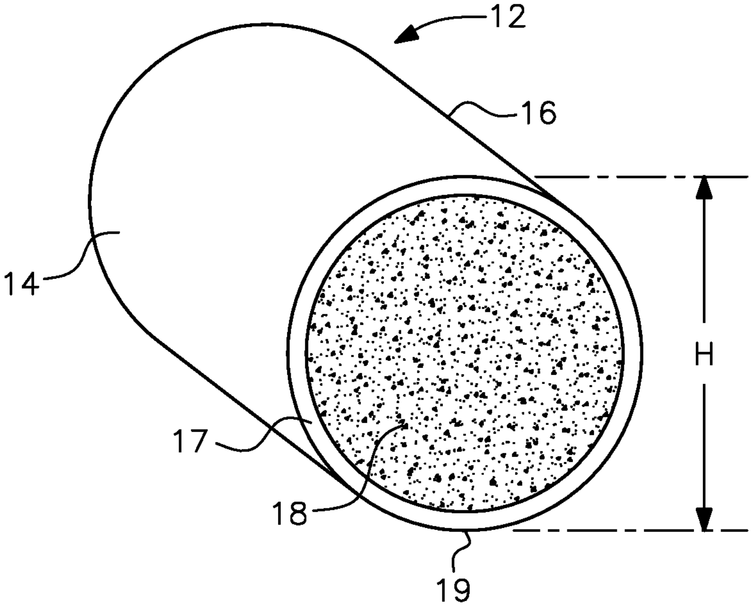
FIG. 4 is a perspective view of a known type of plastic-wrapped round cotton module as produced by one or more commercially available baler cotton picking machines.

As shown in the embodiment of FIGS. 1, 3 and 6-8, the present invention is directed to a protective tarpaulin cover or tarp, generally designated by reference numeral 10, for a round cotton module generally designated by reference numeral 12 like that shown in FIG. 4. The round cotton module 12 has a cylindrical body 14, the outer cylindrical side surface of which is covered with a plastic wrap 16, and two opposed ends 18 at which the cotton 15 is exposed. The exposed ends 18 of the cotton module 12 are generally perpendicular to the longitudinal length of the bale when resting on the ground or other flat surface. The round cotton module 12, as bound with the plastic wrap 16, is built on board a commercially available baler cotton picking machine, such as the John Deere® CS690 and CP690 baler cotton pickers.

The exposed area on the bale ends 18 has a circular surface area and is defined by the inner circumference of a lip 17 of the plastic wrap 16 The plastic wrap 16 includes a lip 17 that extends to form an overhang to facilitate cotton containment in the exposed ends when the lip in intact. However, if the lip 17 is compromised, as by cutting or tearing, so that the cotton is no longer fully constrained by the plastic wrap, the exposed area will be enlarged and lose its regularity in shape as the cotton may expand and even start to escape from the bale as loose cotton (see FIG. 6).

To fittingly cover and protect the cotton module, the tarp includes a flat generally rectangular body sheet 20 that extends over the cylindrical top and side regions of the cotton module from a front edge 24 to a rear edge 26 longitudinally and to lower side edges 22 that run transverse to the longitudinal length of the bale. The lower side edges 22 of the flat body sheet extend close to and generally parallel with the ground.

The tarp 10 also includes end walls 28, 30 that abut the front and rear edges 24, 26 of the body sheet 20 and that cover the exposed ends 18 of the cotton module 12. Each of the end walls 28, 30 is also a flat sheet but is cut to be substantially semi-circular in shape, having an arched top edge 32 and a generally straight bottom edge 34. Like the lower side edges 22, the straight bottom edges 34 extend generally parallel with the ground. The bottom edge 34 of the end walls 28, 30 alternatively may be curved, making the ends walls more circular, to fully cover the exposed ends of the bale.

As shown in the fully secured position in FIG. 3, with the tarp 10 cinched around the cotton module 12, the tarp 10 covers both the top and side portions of the cylindrical body 14 of the bale and most of the exposed area on the ends 18 thereof while, in the embodiment shown, the base 19 of the bale is not covered. Alternatively, the tarp may be made large enough to cover the entirety of the ends. At a minimum, the tarp 10 is constructed to cover a majority, (more than 50%) of the exposed area on the bale ends 18, but preferably covers at least 75%, and more preferably at least 90% of the exposed area.

The actual length and width of the tarp are determined according to the dimensions of the round cotton modules as produced by the relevant baler cotton picking machine. According to the embodiment shown in FIG. 1, the tarp is approximately 8 feet in longitudinal length, about 9 feet wide as measured along the straight bottom edge on the end walls 28, 30, and about 5.5 feet from the apex 32 to the straight bottom edge 34. As used herein in connection with the dimensions of the tarp, the word “about” is intended to refer to the stated value plus or minus 4 inches.

Figure 2:
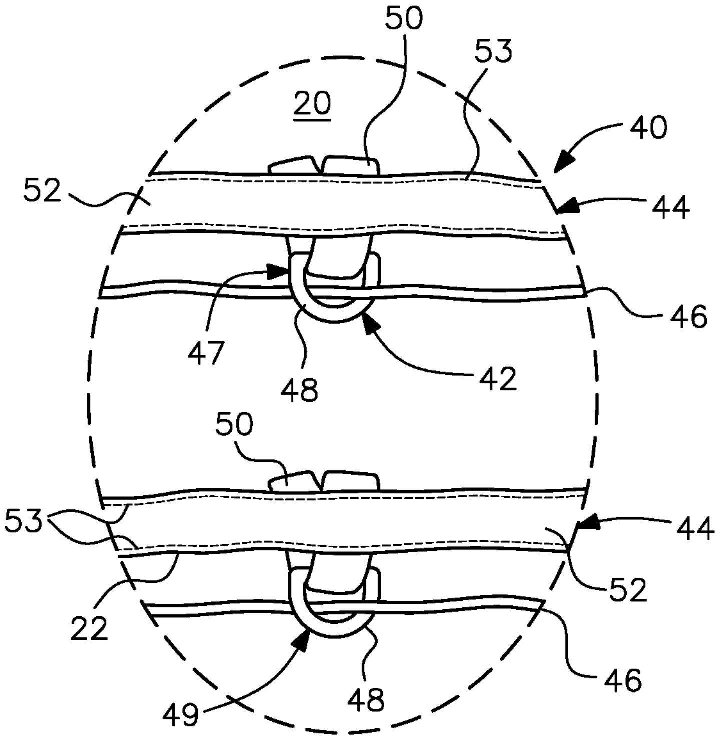
FIG. 2 is an enlarged view of Detail A of FIG. 1.

Both the lower side edges 22 of the body sheet 20 and the bottom edges 34 of the end walls 28, 30 are provided with a cinching structure generally designated by reference numeral 40. The cinching structure 40, an enlarged portion of which is shown in FIG. 2, preferably includes a plurality of spaced ring members, generally designated by reference numeral 42, which are coupled to the tarp 10 by a securing element generally designated by reference numeral 44, and a cinching element 46.

The spaced ring members 42 are preferably embodied as D-rings 48 while the securing element includes a plurality of flexible straps 50 and a length of reinforced webbing 52. Each D-ring 48 is mounted on a strap 50 which is overlaid with the webbing 52 and then the strap and webbing are sewn with stitching 53 or otherwise affixed to the body sheet 20 and end walls 28, 30 of the tarp 10 as shown in FIG. 2.

The cinching element 46 is a continuous strand such as a rope, a cord (whether elastic or non-elastic), a chain, a strap, a flexible cable, and the like, that is passed through the D-rings to tighten the tarp 10 around the cotton bale near the base 19 thereof. To encircle the bale, the cinching element 46 extends through one of the sets of D-rings secured near the hem generally designated by reference numeral 47 of the tarp from a first end at the front of the bale, along a first side thereof, across the rear of the bale and back along a second side of the bale to a second end that meets up with the first end at 50 (see FIG. 3). The two ends of the cinching element 46 are pulled simultaneously to tighten the hem 47 of the tarp against the bale, and then tied or otherwise secured to one another to lock the tarp in place. The two ends may be secured at any point around the bale including the side (see FIG. 8).

Preferably, upper and lower sets 47, 49 of D-rings 48 are provided, each set having a respective cinching element 46, to ensure that the cover is well secured on the bale. The lower set 49 of D-rings is adjacent the hem of the sides and end walls while the upper set 47 is spaced between about 6 inches and about 18 inches, and preferably about 12 inches, above the lower set and in generally parallel relationship therewith.

The distance 31 between the apex 33 of the arched top edge 32 and the straight bottom edge 34 of each end wall (see FIG. 3) is greater than half the height H of the cotton bale (see FIG. 4), and preferably greater than three-quarters of the height of the cotton bale to ensure that the cinching elements 46 are secured around the bale at a point that is below the maximum diameter D or midpoint of the bale and preferably near the ground.

According to a second embodiment of the present invention shown in FIG. 5, a tarp 100 is provided that also covers the top, sides and ends of the cotton module and that is cinched securely to the bale as already described in connection with the first embodiment. However, rather than being sewn along the entire front and rear edges 124, 126 of the body sheet 120, the end walls 128, 130 are sewn to the body sheet only along the upper portions, generally designated by reference numeral 127, thereof. The straight bottom edge 134 of the end walls 128, 130 is extended by the formation of opposing side flaps 129. The side flaps 129, which are about 4 feet in length and about two feet in height, enlarge the effective size of the tarp on the ends 128, 130 in order to cover more loose cotton that may have been released and/or expanded outwardly on the exposed bale ends 18. The side flaps 129 are folded to bring distal ends 131 thereof toward the longitudinal center of the cotton module to overlap adjacent portions of the flat body sheet 120. When used to cover a tarp that is approximately 8 feet in longitudinal length, about 9 feet wide, and about 5.5 feet from the apex 32 to the straight bottom edge 34, the flaps wrap around to overlap about 4 feet along the 8 foot sides. Therefore, if the integrity of the bale has not been compromised, the distal ends 131 of the flaps will be near or in abutment with one another.

Figure 5:
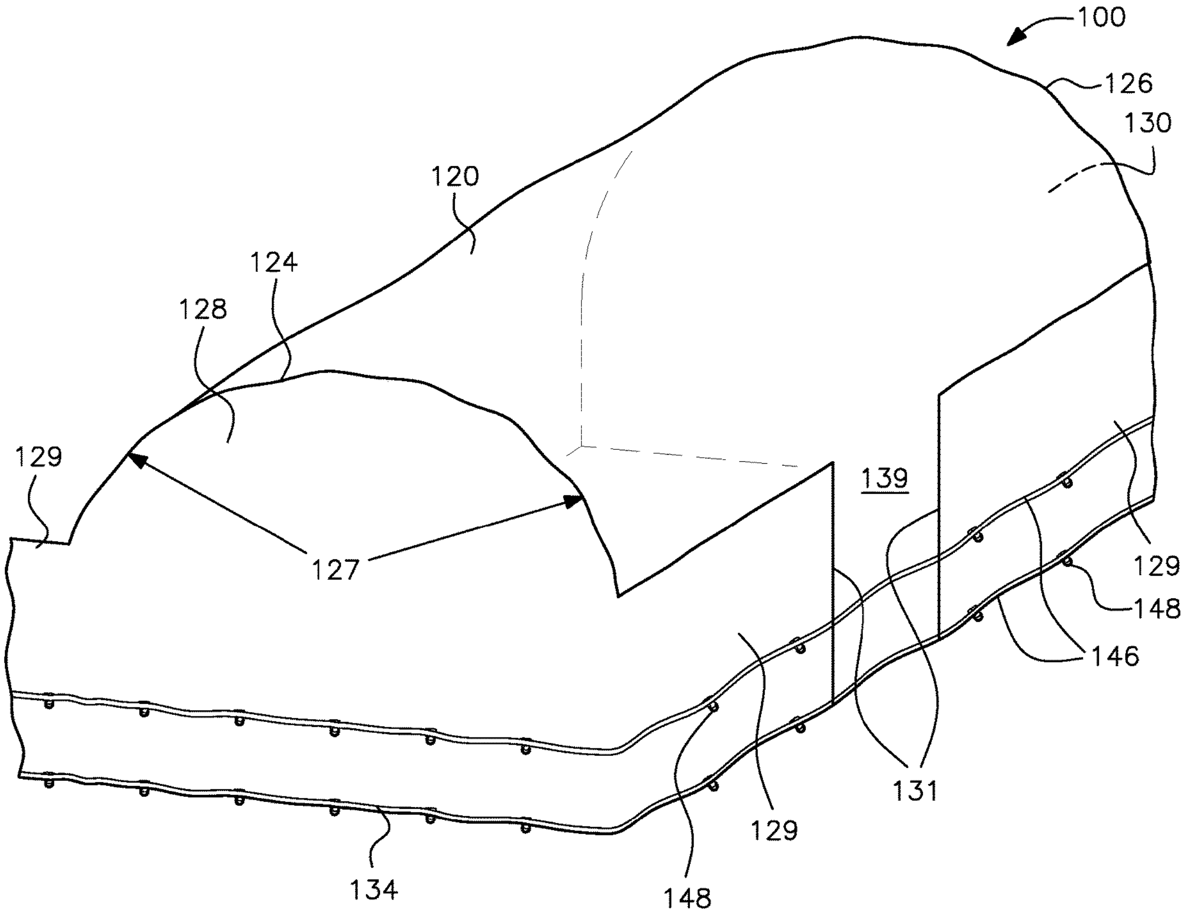
FIG. 5 is a perspective view of a tarp for covering a round cotton module in accordance with a second embodiment of the present invention.
Figure 6:
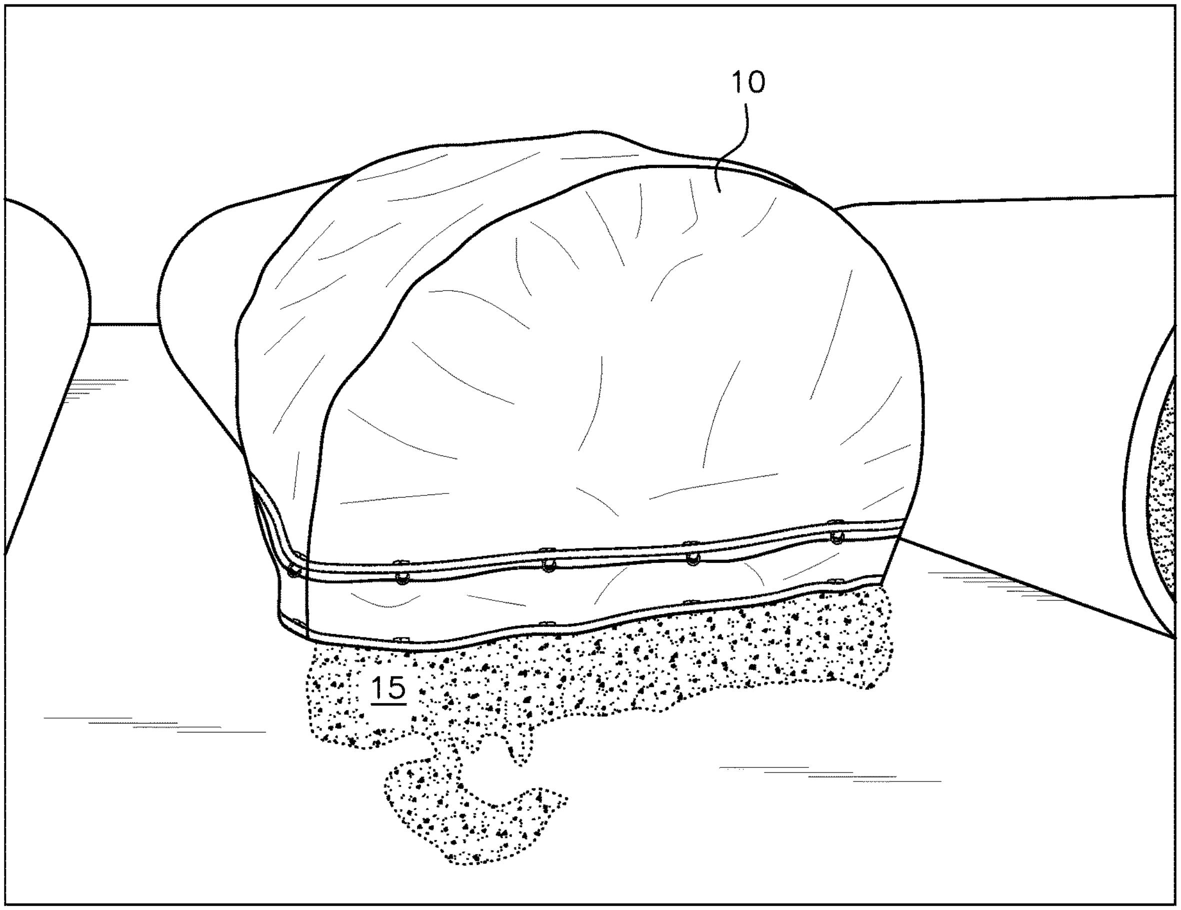
FIG. 6 is an end view photograph of a round cotton module covered by a tarp according to the first embodiment of the present invention.
Figure 7:
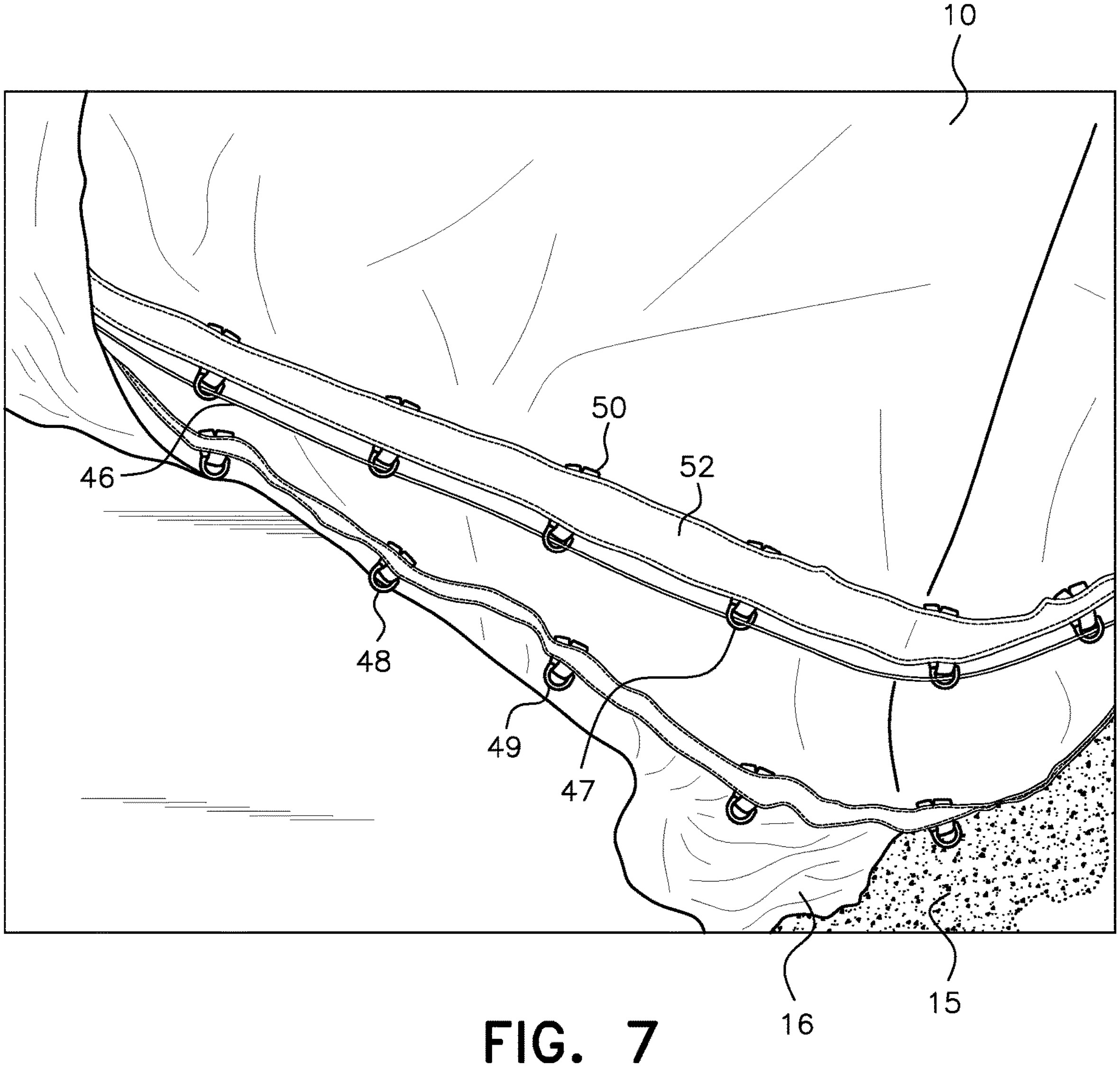
FIG. 7 is a photograph of one side of the installed tarp on the bale as shown in FIG. 6.
Figure 8:
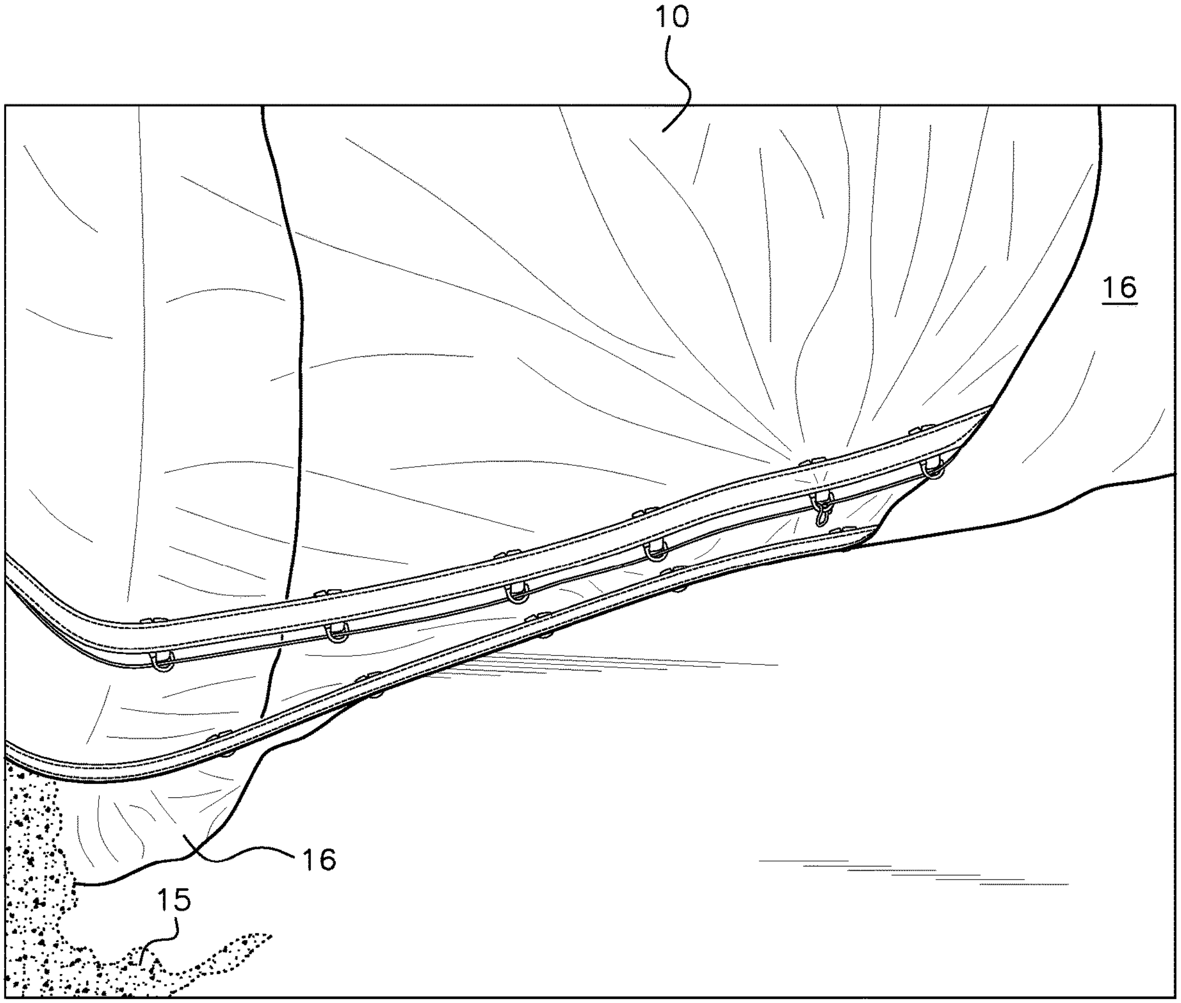
FIG. 8 is a photograph of the other side of the installed tarp on the bale shown in FIGS. 6 and 7, and showing the two ends of the cinching element, embodied as a cord, as tied off along the side of the bale.

When the flaps are folded to wrap around a bale that has been damaged in some manner, allowing the cotton to expand outwardly as shown in FIG. 6, the distal ends 131 of the flaps 129, as extending toward the center from the front and rear of the tarp, are spaced by a center tongue region 139 as shown in FIG. 5. The tarp can thus constrain the cotton while fitting the larger size of the bale due to the bale's condition. The cinching elements 146 are passed through their respective sets of spaced ring members 148 to extend around the bale perimeter, pulling the distal ends of the side flaps toward one another and over the center tongue region 139. The flaps are thus effective to wrap around enlarged ends of the cotton bale that may have expanded and/or become irregular in shape by loose or loosely-contained cotton as can occur, for example, if the lip 17 of the cotton module has been compromised.

In use, the tarp is placed over the cotton bale with the body sheet overlying the plastic wrapped cylindrical top and sides of the bale and the end walls covering the bale ends. If the tarp has flaps, the flaps are folded back over the sides of the bale, with the cinching element running through the D-rings to extend from the distal ends of the front flaps, across the center tongue on each respective side, and to the distal ends of the rear flaps so as to fully encircle the bale around its longitudinal perimeter in a continuous loop as with the tarp that does not include flaps. The hem of the cover is cinched snugly below the midpoint D of the bale by pulling the opposing ends of the cord or rope, as extending through the D-rings, toward one another and tying or otherwise securing the two ends together.

While the tarp has been described as having a body sheet and two end walls, the exact construction of the tarp may be varied provided the tarp covers the bale including the plastic-wrapped top and sides as well as the exposed ends and is cinched near ground level as has been shown and described herein.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A protective cover for a round cotton module built on board a baler cotton picking machine, the module being formed of a relatively large volume of seed cotton harvested from a field and compressed into a generally cylindrical shape having a longitudinally extending cylindrical outer surface wrapped with plastic and two opposed ends with a substantially circular surface area at which the cotton is exposed, the cover comprising:

a generally flat body sheet that fits over top and side portions of the plastic-wrapped cylindrical outer surface;

two end walls secured to front and rear edges of the body sheet and respectively covering over 50% of the two opposed ends of the cotton module, said body sheet and said two end walls being formed as a tarp; and a cinching structure encircling the tarp adjacent lower edges thereof and tightened to secure said tarp around a perimeter of the cotton module at a height below a maximum diameter of the cotton module, said cinching structure including:

a first plurality of spaced ring members secured adjacent said lower edges of the tarp, said first plurality of spaced ring members being mounted on a length of webbing that is secured to extend around a perimeter of the tarp at the lower edges as lower edge webbing;

a cinching element including an elongated continuous strand member that is passed through the first plurality of spaced ring members and tightened to secure the tarp around the cotton module; and a second plurality of spaced ring members mounted on a second length of webbing, said second length of webbing being above and generally parallel with said lower edge webbing, and a second cinching element that is passed through the second plurality of spaced ring members to further secure the tarp around the cotton module.

2. The protective cover as set forth in claim 1, wherein the end walls cover at least 75% of the exposed end surface area.

3. The protective cover as set forth in claim 1, wherein the cinching element is selected from the group consisting of a rope, a cord, a chain, a strap, and a cable.

4. The protective cover as set forth in claim 1, wherein the first plurality of spaced ring members are D-rings.

5. The protective cover as set forth in claim 4, wherein the second plurality of spaced ring members are D-rings.

6. The protective cover as set forth in claim 5, wherein the second length of webbing is about 12 inches above the lower edge webbing.

7. The protective cover as set forth in claim 1, wherein at least one of the end walls includes side flaps on opposing sides of said at least one end wall, said side flaps folding toward a longitudinal center of the cotton module and enabling the tarp to cover a cotton module having an enlarged exposed end.

8. The protective cover as set forth in claim 7, wherein both of the end walls are provided with opposing side flaps that are folded toward the longitudinal center, distal ends of the side flaps being spaced from one another by a center tongue area on the longitudinally extending cylindrical outer surface of the cotton module.

9. The protective cover as set forth in claim 1, wherein the cinching element does not bite into or compress an exterior surface of the cotton module when secured to the cotton module.

10. The combination of a protective cover and a round cotton module as built on board a baler cotton picking machine comprising a round cotton module formed of a relatively large volume of seed cotton harvested from a field and compressed into a generally cylindrical shape having a longitudinally extending cylindrical outer surface wrapped with plastic and two opposed ends with a substantially circular surface area at which the cotton is exposed, the cover including a generally flat body sheet that fits over top and side portions of the plastic-wrapped cylindrical outer surface, two end walls secured to front and rear edges of the body sheet, and respectively covering over 50% of the two opposed ends of the cotton module, and a cinching structure encircling the cover adjacent lower edges thereof and tightened to secure said cover around a perimeter of the cotton module at a height below a maximum diameter of the cotton module.

11. The combination as set forth in claim 10, wherein the cinching structure includes a plurality of spaced ring members secured adjacent said lower edges of the cover, and a cinching element that is passed through the ring members and tightened to secure the cover around the cotton module.

12. The combination as set forth in claim 11, wherein the cinching element is an elongated continuous strand member.

13. The combination as set forth in claim 12, wherein the cinching element is selected from the group consisting of a rope, a cord, a chain, a strap, and a cable.

14. The combination as set forth in claim 11, wherein the spaced ring members are mounted on a length of webbing that is secured to extend around a perimeter of the cover at the lower edges as lower edge webbing.

15. The combination as set forth in claim 14, further comprising a second plurality of spaced ring members mounted on a second length of webbing, said second length being above and generally parallel with said lower edge webbing, and a second cinching element that is passed through the second plurality of spaced ring members to further secure the cover around the cotton module.

16. The combination as set forth in claim 15, wherein the second length of webbing is about 12 inches above the lower edge webbing.

17. The combination as set forth in claim 15, wherein said first and second pluralities of spaced ring members are D-rings.

18. The combination as set forth in claim 10, wherein at least one of the end walls includes side flaps on opposing sides of said at least one end wall, said side flaps folding toward a longitudinal center of the cotton module and enabling the cover to extend over a cotton module having an enlarged exposed end.

19. The combination as set forth in claim 18, wherein both of the end walls are provided with opposing side flaps that are folded toward the longitudinal center, distal ends of the side flaps being spaced from one another by a center tongue area on the longitudinally extending cylindrical outer surface of the cotton module.

20. The combination as set forth in claim 11, wherein the cinching element does not bite into or compress an exterior surface of the cotton module when secured to the cotton module, because the cinching element secures the cover around the bale due to its positioning below the maximum diameter of the bale.

* * * * *